Patented June 22, 1948

2,443,598

UNITED STATES PATENT OFFICE 2,443,598

3-AMINO-4-CARBETHOXY-2-ALKYL DERIVATIVES OF THIOPHENE

Lee C. Cheney and John Robert Piening, Detroit, Mich., assignors to Parke, Davis & Company, Detroit, Mich., a corporation of Michigan No Drawing. Application December 23, 1944, Serial No. 569,639

11 Claims. (Cl. 260—329)

This invention relates to new compounds and methods for preparation of the same, said compounds having the general formula,

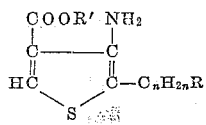

wherein R' is a lower saturated alkyl group, $n$ is 1 to 8 and the alkyl chain ($-C_nH_{2n}-$) may be straight or branched and R is a radical of the class —COOH, —COOM, —COOR', aryloxy, aralkoxy and alkoxy, the group M representing a salt-forming basic group or metal such as sodium or other alkali metal, alkaline earth metals, magnesium, ammonium and substituted ammonium, such as monoalkyl and dialkylammonium.

These new compounds are useful as intermediates in the synthesis of compounds of medicinal interest, particularly of compounds possessing biotin or possibly anti-biotin activity. Moreover, they represent a new class of amino acid derivatives which may prove to possess valuable therapeutic properties.

4-carboalkoxy-3-keto-2-alkyl-tetrahydrothiophenes, having one of the above mentioned groups, R, substituted on a carbon atom of the 2-alkyl group, $-C_nH_{2n}-$, are prepared by methods disclosed in our copending application, Serial No. 551,619, filed August 28, 1944. Said method consists in an internal condensation in the presence of an alkali metal alkoxide of a β-carboalkoxyalkyl-α-carboalkoxyalkyl sulfide, wherein the alkyl carrying the α-carboalkoxy group also carries the substituent R. We have now found that these compounds are readily converted at the 3-keto group into their corresponding oximes by the action of a hydroxylamine salt in the presence of an acid-binding agent. We have further made the surprising discovery that the said oximes can be converted to amines and at the same time aromatized to give a thiophene ring. We can, for example, dissolve the oxime in a suitable non-aqueous inert solvent, such as dry ether, and treat it with a hydrogen halide such as hydrogen chloride or hydrogen bromide, or equivalent compound capable of yielding hydrogen chloride, such as thionyl chloride or phosphorus chloride, whereupon a reaction takes place which apparently involves the elimination of the elements of water and the conversion of the 4-carboalkoxy-3-keto-2-alkyl-tetrahydrothiophene into the corresponding 3-amino-4-carboalkoxy-2-alkyl-thiophene hydrohalide salt. The corresponding free β-amino-thiophene derivatives are obtained by treatment of the said salts with a suitable base, such as ammonium hydroxide or sodium bicarbonate solution. These 3-amino-4-carboalkoxy-2-alkyl-thiophenes are readily diazotized and give orange-pink pigments when their diazonium salts are coupled with 2-naphthol, a test which characterizes the compounds as primary aromatic amines. The process of the invention may be represented by the following three steps:

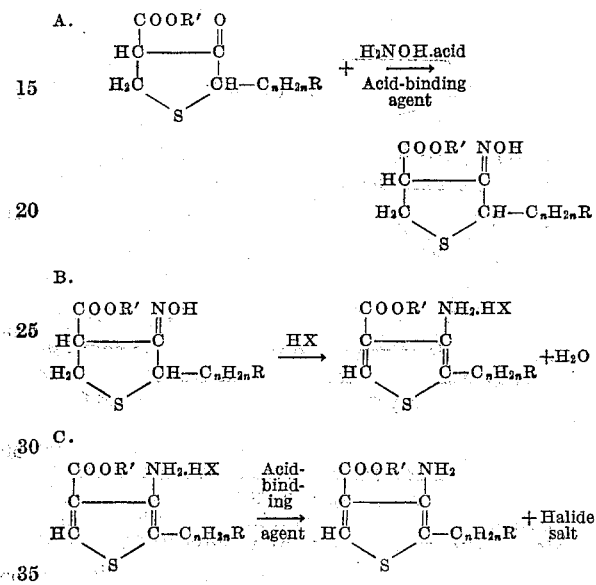

wherein R' is a lower saturated alkyl group, $n$ is 1 to 8 and the aliphatic carbon chain may be either straight or branched, R may be any one of the radicals —COOH, —COOM, —COOR', aryloxy, aralkoxy or alkoxy and X may be chloride, bromide or iodide. It is of course apparent that in the product of reaction B, above, R will never be —COOM since the salt-forming basic group, M, in the presence of the strong acid, HX, will be converted to hydrogen. Hence R in the product of reaction B will have any of the values already given for R except —COOM.

Suitable acid-binding agents for steps A and C include the bicarbonates, carbonates, oxides and hydroxides of the alkali and alkaline earth metals, the alkali salts of lower carboxylic acids, alkali metal alkoxides, ammonium hydroxide, and organic bases such as alkyl amines, pyridine, piperidine, etc.

Very few 3-aminothiophenes have been reported in the literature, and, so far as is known, this is the first method disclosed for the conversion of 3-ketotetrahydrothiophene derivatives into the corresponding 3-aminothiophenes. The reaction goes readily in most instances at ordinary room temperature and the water elimination and concurrent aromatization occur without application of heat.

The following examples illustrate methods of carrying out the invention, but its scope is not to be limited by the reactants and conditions cited therein, as will be apparent to those skilled in the art.

*Example 1*

Ethyl 4-carbethoxy-3-keto-2-tetrahydrothiophene-valerate oxime.—A solution of 30 g. (0.1 mole) of ethyl 4-carbethoxy-3-keto-2-tetrahydrothiophenevalerate in 300 ml. of absolute alcohol is refluxed on the steam bath with 34.8 g. (0.5 mole) of hydroxylamine hydrochloride and 59 g. (0.3 mole) of anhydrous barium carbonate for seven hours. The mixture is filtered and inorganic salt on the filter is washed with hot absolute alcohol. The alcohol is removed under reduced pressure and the residue is taken up in ether, washed with water and dried over sodium sulfate. Salt and then ether are removed and the residue dried over $P_2O_5$ in a vacuum desiccator. The oxime is an oil and weighs 29.87 g.; yield 94%.

Its formula is

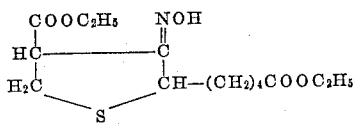

Ethyl 3-amino-4-carbethoxy-2-thiophenevalerate and 3-amino-4-carbethoxy-2-thiophenevaleric acid.—In a 500 ml. three-necked flask fitted with a condenser, stirrer and inlet tube, is placed a solution of 28.96 g. (0.091 mole) of ethyl 4-carbethoxy-3 - keto - 2 - tetrahydrothiophenevalerate oxime in 250 ml. of dry ether. Dry HCl gas is introduced through the inlet tube for thirty minutes while stirring the solution. The solution becomes darker in color and, after stirring for several hours, crystals form. (If they do not form the solution should be stirred several hours longer. Most of the ether and excess HCl should be removed and the residue treated with 200 ml. of dry ether. Scratching the sides of the flask will produce crystals.) The crystals are collected and dried. The crude material weighs 25.15 g. and melts at 101–132° C. The wide range indicates a mixture of amine hydrochlorides.

The free amines are obtained by placing the amine hydrochlorides in an excess of a suitable basic solution (e. g. 10% $NaHCO_3$ or dil. $NH_4OH$). Ether extraction removes the amine diester, ethyl 3-amino - 4 - carbethoxy - 2 - thiophenevalerate, which is obtained by evaporating off the ether, allowing the product to solidify and then recrystallizing from 95% ethanol. The weight is 16.45 g. and the compound melts at 43–44° C.

*Anal.*—Calcd. for $C_{14}H_{21}O_4NS$: C, 56.16; H, 7.07. Found: C, 56.19; H, 7.04.

Its formula is

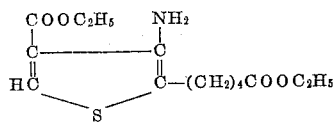

The amine monoacid, 3-amino-4-carbethoxy-2-thiophenevaleric acid, is obtained by neutralizing the basic solution of the diester with a weak acid, e. g. acetic acid. The product is collected and dried; wt. 3.56 g. Recrystallization from water gives crystals, M. P. 97–97.5° C.

*Anal.*—Calcd. for $C_{17}H_{17}O_4NS$: C, 53.12; H, 6.32. Found: C, 53.14; H, 6.32.

The amine monoacid may also be obtained by selective hydrolysis of the diester. A solution of 11 g. (0.0368 mole) of ethyl-3-amino-4-carbethoxy-2-thiophenevalerate in 35.2 ml. of absolute alcohol is treated with 35.2 ml. of 1.045 N alcoholic potassium hydroxide. The solution is allowed to stand for forty-eight hours during which time the potassium salt precipitates from solution. The alcohol is removed in a jet of air. The residue is dissolved in water and extracted three times with ether. The basic solution is acidified to litmus with glacial acetic acid. The product weighs 5.46 g. when dry and melts at 92–94° C. Recrystallization from water raises the melting point to 97–97.5° C.

Evaporation of the ether from the extractions above leaves a residue of 3 g. of the starting material.

The formula of the monoacid is

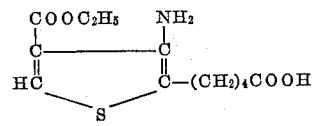

*Example 2*

4-carbethoxy - 3 - keto - 2 - γ - phenoxypropyltetrahydrothiophene oxime.—A mixture of 30.8 g. (0.1 mole) of 4-carbethoxy-3-keto-2-γ-phenoxypropyltetrahydrothiophene, 30.8 g. (0.443 mole) of hydroxylamine HCl, 46.2 g. (0.234 mole) of anhydrous $BaCO_3$ and 300 ml. of absolute alcohol is refluxed on the steam bath for 22 hours and then allowed to stand for two days. The solution is warmed and then filtered using suction. The inorganic residue is washed with 200 ml. of hot absolute alcohol. The filtrate is distilled at reduced pressure. The residue is dissolved in 800 ml. of ether and washed with 500 ml. of water in 3 portions. The ether extract is then dried over $Na_2SO_4$ for six hours. Ether is removed and the residue dried overnight in a vacuum desiccator over $P_2O_5$. In the morning the oxime has partially crystallized and is considered good enough for further synthesis. The yield is 30.35 g. or 94%. A portion of the thick semi-solid mass is treated with a small portion of 95% alcohol and the crystals which fail to dissolve are crystallized from 80% alcohol to obtain colorless crystals, M. P. 101° C.

*Anal.*—Calcd. for $C_{16}H_{21}O_4NS$: C, 59.42; H, 6.54; N, 4.33. Found: C, 59.26; H, 6.33; N, 4.56.

Its formula is

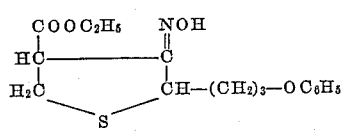

3 - amino - 4 - carbethoxy - 2 - γ - phenoxypropylthiophene hydrochloride.—A mixture of 152.8 g. (0.495 mole) of 4-carbethoxy-3-keto-2-γ-phenoxypropyltetrahydrothiophene, 229.5 g. of anhydrous barium carbonate, 153 g. of hydroxylamine hydrochloride and 1450 ml. of absolute alcohol is refluxed on the steam bath for 15 hours. The inorganic salt is filtered off and washed with 500 ml. of hot absolute alcohol. The alcohol fractions are combined and the alcohol removed at reduced pressure. The residue is taken up in 2500 ml. of ether and washed twice with water and once with saturated NaCl solution, then dried over Na₂SO₄. Ether is removed and the residue dried in a vacuum desiccator over P₂O₅. Weight of dry product is 154 g. (95.5% yield). The oxime is taken up in 800 ml. of dry ether and placed in a 2 l. 3-necked flask. The solution is cooled to 5° C. and then is added 110 ml. of 4.83 N alcoholic HCl (10% excess). The mixture is stirred overnight in an ice bath allowing the bath to come to room temperature. The precipitated amine hydrochloride is filtered and washed thoroughly with dry ether. Weight 82 g. The filtrate is returned to the reaction flask and treated with 30 ml. of 4.83 N alcoholic HCl and allowed to stand for a day with occasional shaking. The precipitate is filtered and washed thoroughly with dry ether. Weight 50 g. The total yield is 132 g. This represents an 81% yield based on oxime or 78% based on keto ester. M. P. 156–161° C. Recrystallization from acetone following treatment with charcoal produces ivory crystals of the desired hydrochloride, M. P. 163–164° C.

*Anal.*—Calcd. for C₁₆H₁₉O₃NS; HCl: N, 4.10. Found: N, 4.19.

Its formula is

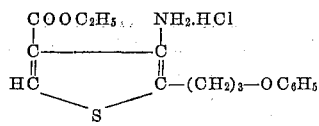

3 - amino - 4 - carbethoxy - 2 - γ - phenoxypropylthiophene.—To 17.1 g. (0.05 mole) of the amine hydrochloride described immediately above is added a solution of 50 ml. of concentrated NH₄OH in 50 ml. of water. Lumps are broken up and the suspension is stirred occasionally for two hours. Following filtration and thorough washing with water, the light brown amorphous product is desiccated in vacuum over P₂O₅; M. P. 55.5–56.5° C.; yield 15.3 g. (quantitative). Decolorizing with charcoal and crystallization from methanol produces cream-colored needles, M. P. 56–57° C.

*Anal.*—Calcd. for C₁₆H₁₉O₃NS: C, 62.9; H, 6.27; N, 4.61. Found: C, 62.98; H, 6.14; N, 4.65.

Its formula is

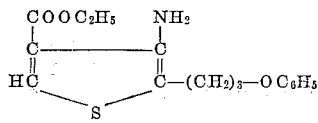

Example 3

4 - carbethoxy - 3 - keto - 2 - γ - benzyloxypropyltetrahydrothiophene oxime.—A mixture of 189 g. (0.586 mole) of 4-carbethoxy-3-keto-2-γ-benzyloxypropyltetrahydrothiophene, 189 g. (2.72 moles) of hydroxylamine hydrochloride, 296 g. (1.50 moles) of anhydrous BaCO₃ and 1500 ml. of absolute alcohol is refluxed on the steam bath for 22 hours. The inorganic salts are removed and washed with alcohol. The filtrate is distilled under reduced pressure to remove alcohol. The residue is taken up in 2 liters of ether and is washed with water and saturated NaCl solution, then dried over Na₂SO₄ for 18 hours. Ether is removed after filtering off Na₂SO₄. The oil is dried in a vacuum desiccator to constant weight. Yield 175 g.; 89%.

*Anal.*—Calcd. for C₁₇H₂₂O₄S: C, 63.32; H, 6.87. Found: C, 63.41; H, 6.61.

Its formula is

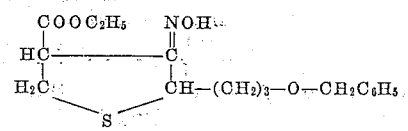

3 - amino - 4 - carbethoxy - 2 - γ - benzyloxypropylthiophene hydrochloride.—To a well stirred cold solution of 17.25 g. (0.0512 mole) of 4-carbethoxy - 3 - keto - 2 - γ - benzyloxypropyltetrahydrothiophene oxime in 75 ml. of dry ether is added in two portions 11 ml. of 5.2 N alcoholic HCl. The mixture is allowed to come to room temperature by keeping it in an ice bath overnight, the ice being allowed to melt without replacement. In the morning the dark solution shows no signs of crystals. An equal volume of ether is added and an oil separates. It is possible that some water present keeps the hydrochloride from crystallizing. The oil is separated and dried in a vacuum desiccator. The ether layer is taken almost to dryness in a stream of air and a crystalline product forms. These crystals are filtered and washed thoroughly with dry ether. Weight when dry 3.71 g.; M. P. 121–125° C. Another 5.25 g. of more crude material is also obtained. Total yield is 8.96 g. or 49.3%. A sample of the crude material is recrystallized several times from methylisobutyl ketone by cooling and adding dry ether. The melting point cannot be raised.

*Anal.*—Calcd. for C₁₇H₂₂O₃NClS: N, 3.93%. Found: N, 4.10%.

Its formula is

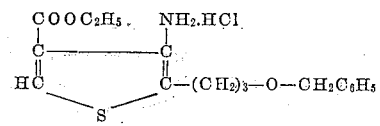

This hydrochloride can also be made as follows: A solution of 67.48 g. (0.2 mole) of 4-carbethoxy - 3 - keto - 2 - γ - benzyloxypropyltetrahydrothiophene oxime in 500 ml. of dry ether is treated at room temperature with anhydrous HCl. The addition is regulated so that approximately 5–8 bubbles per second are passed through the H₂SO₄ bubble counter. The condenser is protected by a CaCl₂ tube. At five minute intervals the escaping gases are exposed to concentrated NH₄OH. Very little HCl is detected for about 20 minutes. At the end of 30 minutes the evolution of HCl is greater. The introduction of HCl is stopped at the end of 35 minutes. The solution has become much darker by this time and an oily substance has collected on the sides of the flask. Stirring is continued for seven hours and then the reaction mixture is allowed to stand overnight. Crystals have formed after three hours. Cooling in an ice bath for several hours aid after this point. The mixture is cooled again before filtering the crystals. The weight of dry, crude material is 55.4 g. (78% yield).

Example 4

Reaction of 4-carbethoxy-3-keto-2-γ-phenoxypropyltetrahydrothiophene oxime with HCl in acetic acid-acetic anhydride and using heat.— After dissolving 5.2 g. of 4-carbethoxy-3-keto-2-γ-phenoxypropyltetrahydrothiophene oxime in 50 ml. of glacial acetic acid, 6 ml. of acetic anhydride is added and dry HCl is conducted for 1 hour into the solution heated by means of a boiling water bath. The brown solution is diluted with water to a volume of 250 ml. and placed in the refrigerator. Following filtration, the light brown crystals are washed with water and dried at 70° C.; weight 3.2 g. Recrystallization from acetone, following treatment with decolorizing charcoal, yields only 0.8 g. of 3-amino-4-carbethoxy-2-γ-phenoxypropylthiophene hydrochloride, M. P. 163.5-164.5° C.

Although, as already described, various reagents and reaction media can be used in carrying out reactions A, B and C, we prefer to use those compounds, dilutions and other conditions in steps A and C which do not result in any substantial hydrolysis of the ester group —COOR' at position 4 of the heterocyclic ring. In step A, we have found that any of the known methods of forming an oxime from an aliphatic β-keto-ester may be used.

As explained above, in step B wherein the oxime is converted to an amine, one can use a reagent which generates hydrogen halide in contact with an oxime, such as sulfuryl halides or phosphorus halides. Hence, in the appended claims where the expression "hydrogen halide" is used this should be understood as including not only the preferred halides of the class hydrogen chloride and hydrogen bromide, but also known reagents capable of generating these halides in contact with the oxime.

Attention is called to our copending divisional application, Serial No. 658,874, filed April 1, 1946, wherein the herein described oximes of 4-carboalkoxy-3-keto-2-alkyl-tetra-hydrothiophenes and the method for obtaining the same from the corresponding 3-keto compounds are shown and claimed.

Certain of our other copending applications describe and claim intermediates useful in the preparation of the 4-carboalkoxy-3-keto-2-alkyl tetrahydrothiophenes described and claimed in our above-mentioned application, Serial No. 551,619, filed August 28, 1944. Among such other copending applications are the following: Serial No. 550,483, filed August 21, 1944; Serial No. 550,484, filed August 21, 1944; Serial No. 610,686, filed August 13, 1945 and Serial No. 610,687, filed August 13, 1945.

Attention is also called to our copending applications Serial No. 577,155, filed February 9, 1945, and Serial No. 569,640, filed December 23, 1944, and to the divisional applications of the latter, Serial No. 660,402, Serial No. 660,403, Serial No. 660,404, and Serial No. 660,405, all filed April 8, 1946, wherein a method for converting the products of the instant invention to biotin and biotin-like compounds is described and claimed.

What we claim as our invention is:

1. Process for obtaining thiophene compounds which comprises reacting an oxime of formula,

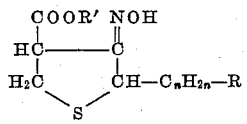

with a hydrogen halide of the class consisting of hydrogen chloride and hydrogen bromide in absence of substantial amounts of water to obtain an amine salt of formula,

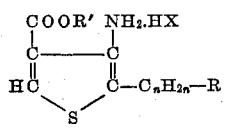

and reacting the amine salt with an acid binding agent capable of neutralizing the acid, HX, to obtain a compound of formula,

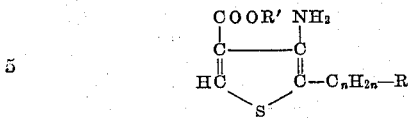

where R' is a lower alkyl radical, $n$ is an integer from 1 to 8 inclusive, R is a member of the class —COOH, —COOR', aryloxy, aralkoxy and alkoxy and HX represents a hydrogen halide of said class.

2. Process for obtaining thiophene compounds which comprises reacting an oxime of formula,

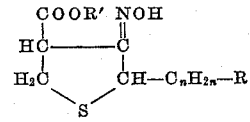

with a hydrogen halide of the class consisting of hydrogen chloride and hydrogen bromide in absence of substantial amounts of water to obtain an amine salt of formula,

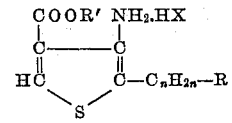

and reacting the amine salt with an acid binding agent capable of neutralizing the acid, HX, to obtain a compound of formula,

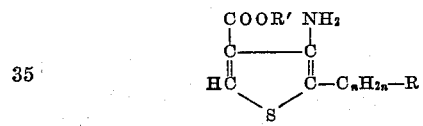

where R' is a lower alkyl radical, $n$ is an integer from 1 to 8 inclusive, R is the ester group —COOR' and HX represents a hydrogen halide of the class hydrogen chloride and hydrogen bromide.

3. In a process for obtaining thiophene compounds, the step which comprises reacting an oxime of formula,

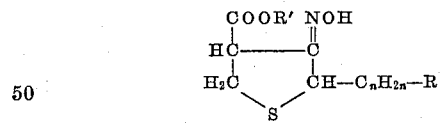

with a hydrogen halide of the class consisting of hydrogen chloride and hydrogen bromide in absence of substantial amounts of water to obtain a compound of formula,

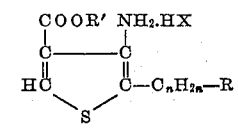

where R' is a lower alkyl radical, $n$ is an integer from 1 to 8 inclusive, R is the ester group —COOR' and HX represents one of hydrogen chloride and hydrogen bromide.

4. In a process for obtaining thiophene compounds, the step which comprises reacting an oxime of formula,

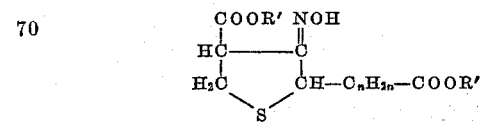

with hydrogen chloride in absence of substantial amounts of water to obtain a compound of formula,

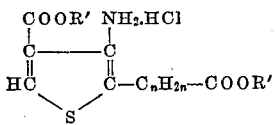

where R' is a lower alkyl radical and $n$ is an integer from 1 to 8 inclusive.

5. Process for obtaining thiophene compounds which comprises reacting an oxime of formula,

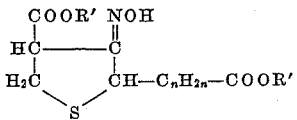

with hydrogen chloride in substantial absence of initial amounts of water to obtain an amine hydrochloride of formula,

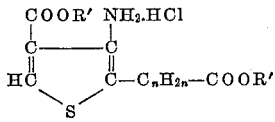

and reacting the amine hydrochloride with an acid binding agent capable of neutralizing the acid, HCl, to obtain a compound of formula,

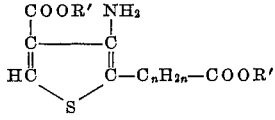

where R' is a lower alkyl radical and $n$ is an integer from 1 to 8 inclusive.

6. An amine compound of the formula,

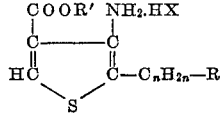

where R' is a lower alkyl radical, $n$ is an integer from 1 to 8 inclusive, R is a member of the class consisting of —COOH, —COOR', aryloxy, aralkoxy and alkoxy, and HX is a member of the class hydrogen chloride and hydrogen bromide.

7. An amine of the formula

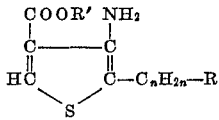

where R' is a lower alkyl radical, $n$ is an integer from 1 to 8 inclusive, R is a member of the class —COOH, —COOM, —COOR', aryloxy, aralkoxy and alkoxy, and M is a salt-forming basic group.

8. 3-amino-4-carbethoxy-2-thiophenevaleric acid.

9. 3-amino-4-carbethoxy-2-γ-phenoxypropyl-thiophene.

10. 3-amino-4-carbethoxy-2-γ-benzyloxypropylthiophene.

11. A compound of the class consisting of an amine free base, its hydrobromide salt and its hydrochloride salt, said amine free base having the formula

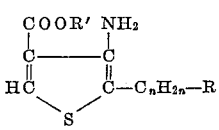

where R' is a lower alkyl radical, $n$ is an integer from 1 to 8 inclusive, R is a member of the class —COOH, —COOM, —COOR', aryloxy, aralkoxy and alkoxy, and M is a salt-forming basic group.

LEE C. CHENEY.
JOHN ROBERT PIENING.